(12) United States Patent
Lee

(10) Patent No.: US 9,486,085 B2
(45) Date of Patent: Nov. 8, 2016

(54) BOILER FOR HOT WATER HEATING MATS

(71) Applicant: SAMWON ONSPA CO., LTD., Gyeonggi-do (KR)

(72) Inventor: Seong Geun Lee, Seoul (KR)

(73) Assignee: SAMWON ONSPA CO., LTD., Gyeonggi-Do (KR)

( * ) Notice: Subject to any disclaimer, the term of this patent is extended or adjusted under 35 U.S.C. 154(b) by 109 days.

(21) Appl. No.: 14/500,025

(22) Filed: Sep. 29, 2014

(65) Prior Publication Data
US 2015/0093101 A1 Apr. 2, 2015

(30) Foreign Application Priority Data
Oct. 2, 2013 (KR) .................. 10-2013-0118154

(51) Int. Cl.
| | |
|---|---|
| F24H 1/18 | (2006.01) |
| F24H 1/20 | (2006.01) |
| A47C 21/04 | (2006.01) |
| F24H 1/10 | (2006.01) |
| F24D 3/16 | (2006.01) |
| H05B 1/02 | (2006.01) |

(52) U.S. Cl.
CPC .............. *A47C 21/048* (2013.01); *F24D 3/16* (2013.01); *F24H 1/102* (2013.01); *H05B 1/0269* (2013.01); *F24D 2220/048* (2013.01)

(58) Field of Classification Search
CPC .......... F24D 3/00; F24D 3/12; F24D 19/083; F24D 1/02; F24D 3/125; F24D 3/141; F24D 3/142; F24D 3/145; F24H 1/06; F24H 1/125; F24H 1/142; F24H 1/225; F24H 9/2035; F24H 1/121; F24H 1/122; F24H 9/02
See application file for complete search history.

(56) References Cited

U.S. PATENT DOCUMENTS

| | | | | |
|---|---|---|---|---|
| 3,894,213 | A * | 7/1975 | Agarwala ............ | A47C 21/048 126/204 |
| 5,033,673 | A * | 7/1991 | Matsumoto ............... | F24D 3/00 237/60 |
| 8,306,407 | B2 * | 11/2012 | Yang ........................ | F24D 15/02 392/307 |
| 8,893,708 | B2 * | 11/2014 | Cho .......................... | F23D 14/28 126/204 |
| 2011/0271915 | A1 * | 11/2011 | Cho .......................... | F23D 14/28 122/14.2 |
| 2011/0315252 | A1 * | 12/2011 | Oh ............................ | F04B 19/24 137/564 |
| 2012/0017850 | A1 * | 1/2012 | Cho ........................ | F24D 19/083 122/406.1 |
| 2015/0176847 | A1 * | 6/2015 | Shin .......................... | F24H 1/121 237/69 |

FOREIGN PATENT DOCUMENTS

KR 10-0948908 3/2010

* cited by examiner

*Primary Examiner* — Thor Campbell
(74) *Attorney, Agent, or Firm* — Norris McLaughlin & Marcus, P.A.

(57) ABSTRACT

A boiler for hot water heating mats, including: a hot water heating tank having a hot water discharging port, a hot water recovering port, and an electric heater; a hot water storage tank connected to the hot water heating tank, with a water charging port, an air exhausting port, a hot water inlet port and a hot water outlet port; a hot water discharging check valve; and a hot water recovering check valve. The heater is installed horizontally or inclinedly, and the interior space of the hot water heating tank is divided into a hot water heating chamber and a hot water discharging chamber. To ensure the heater remains partially submerged in water, the hot water discharging port may be formed at a height higher than the lower surface of the heater or a retaining wall may be installed on the bottom of the hot water heating tank.

10 Claims, 13 Drawing Sheets

BOILER FOR HOT WATER HEATING MATS

CROSS REFERENCE TO RELATED APPLICATION(S)

This application claims the benefit of Korean Patent Application No. 10-2013-0118154, filed on Oct. 2, 2013, which is hereby incorporated by reference in its entirety into this application.

BACKGROUND OF THE INVENTION

1. Field of the Invention

The present invention relates, in general, to a boiler for hot water heating mats and, more particularly, to a boiler for hot water heating mats, in which an electric heater is installed horizontally or inclinedly in a hot water heating tank, with a hot water discharging port of the hot water heating tank formed at a height higher than the height of a lower surface of the electric heater or with a retaining wall installed on the inner surface of the bottom of the hot water heating tank so that, even when hot water heated by the electric heater is discharged from the hot water heating tank to a hot water storage tank due to steam pressure formed in the hot water heating tank, a desired amount of hot water remains on the bottom of the hot water heating tank without being discharged to ensure that the electric heater remains partially submerged, and accordingly, the boiler can automatically exhaust air along with expanded steam from the hot water heating tank only by a heating operation of the electric heater without using a conventional air exhausting solenoid valve that may be frequently broken due to a repeated operation thereof in a high temperature hot water environment, so the present invention can efficiently prevent a reduction in the amount of circulated hot water or an interruption of the circulation of hot water, which may be caused by air remaining in the hot water heating tank, and can realize improved durability of the boiler by solving various problems caused by the conventional air exhausting solenoid valve.

2. Description of the Related Art

Generally, a hot water heating mat is a heating mat that is internally provided with a hot water circulation hose and is heated by hot water supplied from a small capacity boiler connected to the mat body by a connecting hose.

The hot water heating mat is advantageous in that it can solve problems experienced in a conventional electric heating mat internally provided with an electric heating wire. Here, examples of the problems experienced in the conventional electric heating mat may be harmful electromagnetic waves, a fire or an electric shock, which may be generated by the electric heating wire installed in the in mat body.

A conventional boiler used to supply hot water to the hot water heating mat typically uses an electric motor pump for circulating hot water heated by an electric heater. Due to the electric motor pump, the conventional boiler for hot water heating mats is problematic in that the electric motor pump is repeatedly operated in a high temperature hot water environment, so the pump may be easily broken and the durability of the pump is greatly reduced, and noises and vibrations generated from an electric motor of the electric motor pump during operation of the pump directly travel to the outside of the boiler, thereby causing unpleasant noise and disturbing the user or people nearby.

Another problem of the conventional boiler for hot water heating mats resides in that, when the hot water circulation hose of a hot water heating mat is folded, for example, through user carelessness, hot water may not easily flow through the hot water circulation hose resulting in overload of the electric motor pump generating a pumping force for circulating the hot water. Thus, durability of the boiler for hot water heating mats may be greatly reduced due to, for example, user carelessness.

In an effort to solve the above-mentioned problems, a convection boiler for hot water heating mats, which is configured to naturally circulate hot water in a hot water heating mat using steam pressure generated in a hot water heating tank during an operation of heating hot water, was proposed. However, this conventional convection boiler using steam pressure is problematic in that, when the hot water circulation hose of the hot water heating mat is inadvertently folded, hot water may not easily flow through the hot water circulation hose, thus excessively increasing the steam pressure to a level causing explosion of the boiler.

To solve the problems experienced in the conventional convection boiler using steam pressure, the applicant of this invention developed a boiler for hot water heating mats and filed a patent application for the boiler, and the application was granted in Korean Patent No. 10-0948908. In the boiler, a water storage tank having both a reserve water storage chamber and a hot water storage chamber therein is installed at a location above a hot water heating tank having an electric heater and is connected thereto such that, when hot water is heated by the electric heater and is discharged from the hot water heating tank to the hot water storage chamber of the water storage tank due to steam pressure formed in the hot water heating tank, the hot water can circulate in a hot water heating mat by a vacuum suction force formed in the hot water heating tank.

Described in detail, in the boiler for hot water heating mats of the present applicant, a hot water heating tank 32 is installed in a lower part inside the boiler as shown in FIG. 9, with a water level sensor 33 and an electric heater 34 installed in the tank 32. Further, a reserve water inlet port 35 is formed on a predetermined outside portion of the tank 32, and a hot water discharging port 36 and a hot water recovering port 37 having respective check valves 36a and 37a are formed on other predetermined outside portions of the tank 32. A water storage tank 38 is installed in an upper part inside the boiler. The inner space of the tank 38 is divided into a reserve water storage chamber 40 and a hot water storage chamber 50 by a partition wall 39 having an overflow opening 39a formed on the top end of the partition wall 39. In the upper wall of the reserve water storage chamber 40 of the water storage tank 38, a reserve water charging port 41 and an air exhausting port 43 are formed. Here, the reserve water charging port 41 is opened and closed by a plug 42, and the air exhausting port 43 is provided with a vaporization preventing plate 44. Further, a steam guide plate 45 extends downward from the inner surface of the upper wall of the reserve water storage chamber 40 at a location adjacent to the partition wall 39, so, when steam is discharged from the hot water storage chamber 50 via the overflow opening 39a of the partition wall 39, the steam guide plate 45 can guide the steam to a lower part inside the reserve water storage chamber 40. A reserve water outlet port 46 is formed in the lower wall of the reserve water storage chamber 40, and a water deficiency sensor 47 is installed in a lower part of the reserve water storage chamber 40. In the lower wall of the hot water storage chamber 50 of the water storage tank 38, a hot water inlet port 51 and a hot water outlet port 52 are formed. Here, the reserve water inlet port 35 of the hot water heating tank 32 is connected to the reserve water outlet port 46 of the reserve water storage chamber 40 by a reserve water supplying pipe 53 having a solenoid valve 54, and the hot water discharging port 36 of the hot water heating tank 32 is connected to the hot water inlet port 51 of the hot water storage chamber 50 by a connection pipe 49.

The above-mentioned conventional boiler for hot water heating mats is advantageous in that the water storage tank 38 having both the reserve water storage chamber 40 and the hot water storage chamber 50 is installed at the location above the hot water heating tank 32 having the electric heater 34 and is connected thereto such that, when hot water is heated by the electric heater 34 and is discharged from the hot water heating tank 32 to the hot water storage chamber 50 of the water storage tank 38 due to steam pressure formed in the hot water heating tank 32, the hot water can circulate in a hot water heating mat by the vacuum suction force formed in the hot water heating tank 32. Further, even when the hot water circulation hose of the hot water heating mat is blocked or the interior of the hot water heating tank 32 is filled with air, the solenoid valve 54 of the reserve water supplying pipe 53 connecting the hot water heating tank 32 to the reserve water storage chamber 40 of the water storage tank 38 is automatically opened. Thus, reserve water can be automatically supplied from the reserve water storage chamber 40 of the water storage tank 38 to the hot water heating tank 32, thereby preventing a reduction in the amount of circulated hot water or an interruption of the circulation of hot water, which may be caused by the blocking of the hot water circulation hose or the air remaining in the hot water heating tank.

However, the above-mentioned boiler for hot water heating mats is problematic as follows. In the boiler, the solenoid valve 54 provided to automatically supply reserve water from the reserve water storage chamber 40 of the water storage tank 38 to the hot water heating tank 32 when the hot water circulation hose of the hot water heating mat is blocked or the interior of the hot water heating tank 32 is filled with air is repeatedly operated in a high temperature hot water environment. Here, the inner diameter of a water passing orifice of the solenoid valve 54 required to be repeatedly operated in the high temperature hot water environment is excessively small, so the solenoid valve 54 may frequently malfunction due to impurities and may fail to efficiently exhaust air or to efficiently supply reserve water to the hot water heating tank, thereby greatly reducing durability of the boiler.

The foregoing is intended merely to aid in the understanding of the background of the present invention, and is not intended to mean that the present invention falls within the purview of the related art that is already known to those skilled in the art.

DOCUMENTS OF RELATED ART (Patent Document 1 Korean Patent 10-0948908.

SUMMARY OF THE INVENTION

Accordingly, the present invention has been made keeping in mind the above problems occurring in the related art, and the present invention is intended to propose a boiler for hot water heating mats, in which an electric heater is installed horizontally or inclinedly in a hot water heating tank, with a hot water discharging port of the hot water heating tank formed at a height higher than the height of a lower surface of the electric heater or with an retaining wall installed on the inner surface of the bottom of the hot water heating tank so that, even when hot water heated by the electric heater is discharged from the hot water heating tank to a hot water storage tank due to steam pressure formed in the hot water heating tank, a desired amount of hot water remains on the bottom of the hot water heating tank without being discharged to ensure that the electric heater remains partially submerged, and accordingly, the boiler can automatically exhaust air along with expanded steam from the hot water heating tank only by a heating operation of the electric heater without using a conventional air exhausting solenoid valve that may be frequently broken due to a repeated operation thereof in a high temperature hot water environment, so the present invention can efficiently prevent a reduction in the amount of circulated hot water or an interruption of the circulation of hot water, which may be caused by air remaining in the hot water heating tank, and can realize improved durability of the boiler by solving various problems caused by the conventional air exhausting solenoid valve.

In order to achieve the above object, according to one aspect of the present invention, there is provided a boiler for hot water heating mats, including: a hot water heating tank, with a hot water discharging port formed on a predetermined outside portion of the hot water heating tank, a hot water recovering port formed on another predetermined portion of the hot water heating tank so as to connect the hot water heating tank to a hot water heating mat, and a water level sensor and an electric heater installed inside the hot water heating tank; a hot water storage tank connected to the hot water heating tank, with a water charging port formed on a predetermined outside portion of the hot water storage tank and opened or closed by a cap, an air exhausting port formed on another predetermined outside portion of the hot water storage tank, a hot water inlet port and a hot water outlet port formed on other predetermined outside portions of the hot water storage tank so as to be connected to the hot water discharging port of the hot water heating tank and to the hot water heating mat, respectively, and a water deficiency sensor installed inside the hot water storage tank; a hot water discharging check valve installed on the hot water discharging port of the hot water heating tank, the hot water inlet port of the hot water storage tank or a connection pipe connecting the hot water discharging port of the hot water heating tank to the hot water inlet port of the hot water storage tank; and a hot water recovering check valve installed on the hot water recovering port of the hot water heating tank, wherein the electric heater is installed horizontally or inclinedly in the hot water heating tank; and the hot water discharging port of the hot water heating tank is formed at a height higher than a height of a lower surface of the electric heater so that part of the electric heater remains submerged in water.

In an embodiment, a retaining wall for retaining hot water in the hot water heating tank may be installed on the inner surface of the bottom of the hot water heating tank so that a part of the electric heater remains submerged in water.

Further, the interior space of the hot water heating tank may be divided by a steam/water separating wall having a flow passage opening on the lower end thereof into a hot water heating chamber in which the electric heater is installed and a hot water discharging chamber in which the hot water discharging port is formed.

In an embodiment, a plurality of muffling walls may be installed in the hot water heating tank at spaced locations between the steam/water separating wall and the hot water discharging port in such a way that the muffling walls extend downward from the inner surface of the upper wall of the hot water heating tank Further, a reverse flow hole having a fine size may be formed in the hot water inlet port of the hot water storage tank or in the connection pipe connecting the hot water discharging port of the hot water heating tank to the hot water inlet port of the hot water storage tank, the reverse flow hole allowing water stored in the hot water storage tank to flow reversely from the hot water storage tank into the hot water heating tank.

In the present invention, each of the hot water discharging check valve and the hot water recovering check valve may include: a cylindrical valve housing having a valve seat on a first end thereof; a pin support formed in the valve housing, with a pin insert hole formed through a center of the pin support and with a plurality of through holes formed through the pin support at positions around the pin insert hole; a disc support pin inserted into the pin insert hole of the pin support, with a disc stopper formed on a first end of the disc support pin and a spring stopper formed on a second end of the disc support pin; a coil spring fitted over an outer circumferential surface of the disc support pin and placed between the pin support and the spring stopper of the disc support pin; and a valve on/off disc combined with the disc stopper of the disc support pin and brought into close contact with the valve seat of the valve housing by elasticity of the coil spring.

Further, an overcharging prevention unit may be provided on a position below the water charging port of the hot water storage tank, the overcharging prevention unit including: a guide rod vertically installed on the inner surface of the bottom of the hot water storage tank, and a ring-shaped float movably fitted over the guide rod.

As described above, in the boiler for hot water heating mats according to the present invention, an electric heater is installed horizontally or inclinedly in a hot water heating tank, with a hot water discharging port of the hot water heating tank formed at a height higher than the height of a lower surface of the electric heater or with an retaining wall installed on the inner surface of the bottom of the hot water heating tank so that, even when hot water heated by the electric heater is discharged from the hot water heating tank to a hot water storage tank due to steam pressure formed in the hot water heating tank, a desired amount of hot water remains on the bottom of the hot water heating tank without being discharged to ensure that the electric heater remains partially submerged. Accordingly, the boiler of the present invention can automatically exhaust air along with expanded steam from the hot water heating tank only by a heating operation of the electric heater without using a conventional air exhausting solenoid valve that may be frequently broken due to a repeated operation thereof in a high temperature hot water environment, so the present invention can efficiently prevent a reduction in the amount of circulated hot water or an interruption of the circulation of hot water, which may be caused by air remaining in the hot water heating tank, and can realize improved durability of the boiler by solving various problems caused by the conventional air exhausting solenoid valve.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinbelow, exemplary embodiments of the present invention will be described in detail with reference to the accompanying drawings, FIGS. 1 to 8E.

Figure 2:
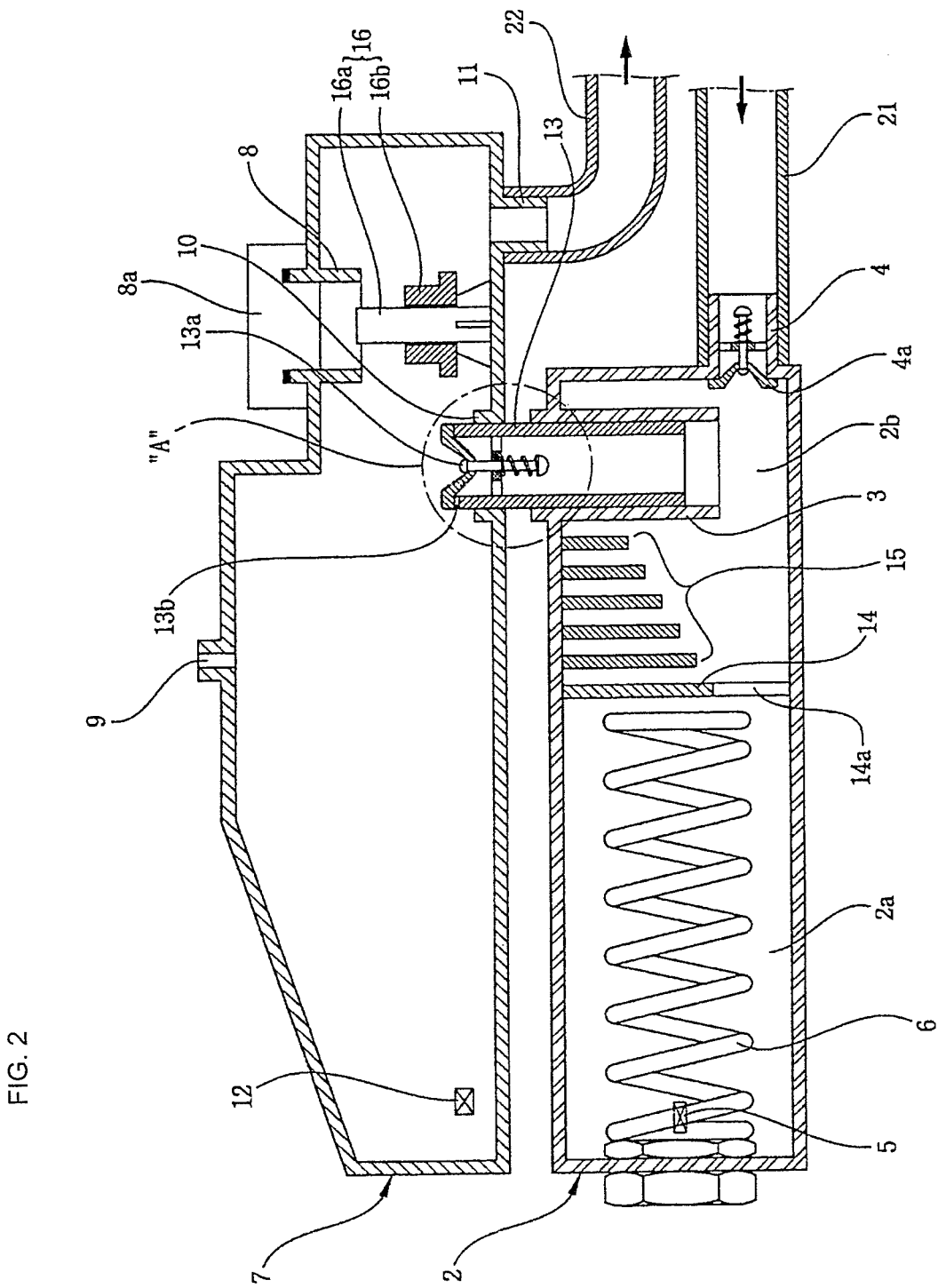
FIG. 2 is a sectional view illustrating the construction of the boiler for hot water heating mats according to a first embodiment of the present invention.

As shown in FIG. 2, a boiler for hot water heating mats according to the present invention includes a hot water heating tank 2, a hot water storage tank 7, a hot water discharging check valve 13a and a hot water recovering check valve 4a.

The hot water heating tank 2 is a core element of the boiler, which sequentially performs hot water heating using an electric heater, hot water discharging using steam pressure produced in the hot water heating, and hot water recovering using a vacuum suction force produced after the hot water discharging. A hot water discharging port 3 is formed on a predetermined outside portion of the tank 2, a hot water recovering port 4 is formed on another predetermined portion of the tank 2 so as to connect the tank 2 to a hot water heating mat, and both a water level sensor 5 and an electric heater 6 are installed inside the tank 2.

Here, to increase the hot water contact surface of the electric heater 6 that comes into contact with hot water remaining on the bottom of the hot water heating tank 2 even when hot water is discharged from the hot water heating tank 2 due to steam pressure, the electric heater 6 may be installed horizontally or inclinedly in the hot water heating tank 2.

Further, to allow a part of the electric heater 6 installed in the hot water heating tank 2 to be always submerged under water inside the hot water heating tank 2, the hot water discharging port 3 of the hot water heating tank 2 may be formed at a height higher than the height of the lower surface of the electric heater 6.

Due to the relationship between the position of the lower surface of the electric heater 6 and the position of the hot water discharging port 3 of the hot water heating tank 2 formed at the height higher than the height of the lower surface of the electric heater 6, even when hot water is heated by the electric heater 6 and is discharged from the hot water heating tank 2 by steam pressure formed in the tank 2, a desired amount of hot water remains on the bottom of the hot water heating tank 2 without being discharged to ensure that the electric heater 6 remains partially submerged, thereby efficiently exhausting air from the tank 2 only by the heating operation of the electric heater 6.

Figure 4A:
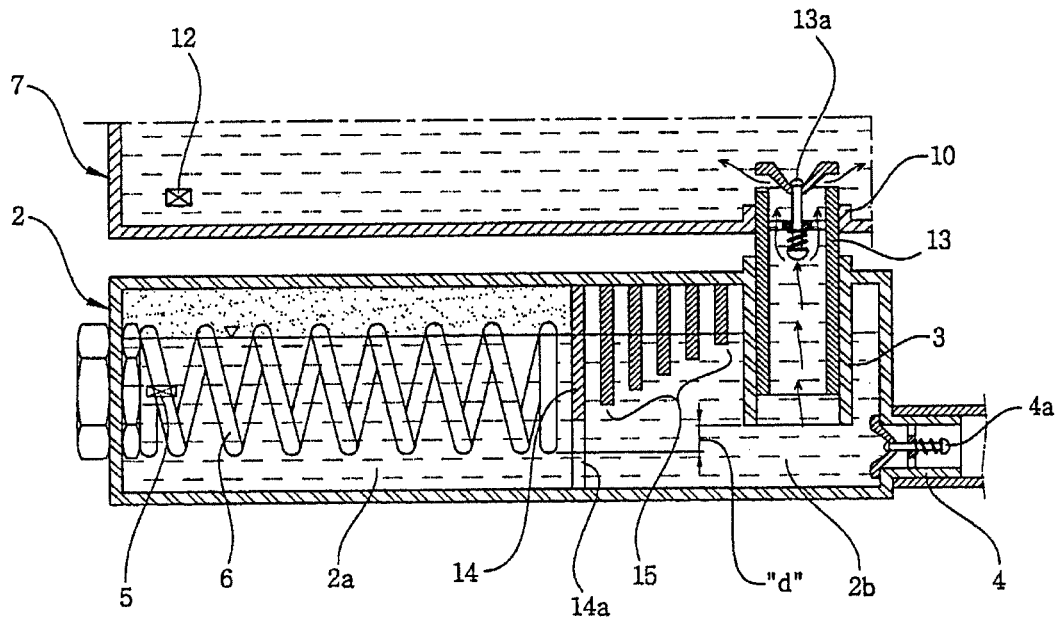
FIGS. 4A and 4B are sectional views illustrating an automatic air exhausting procedure of the boiler for hot water heating mats according to the first embodiment of the present invention.
Figure 4B:
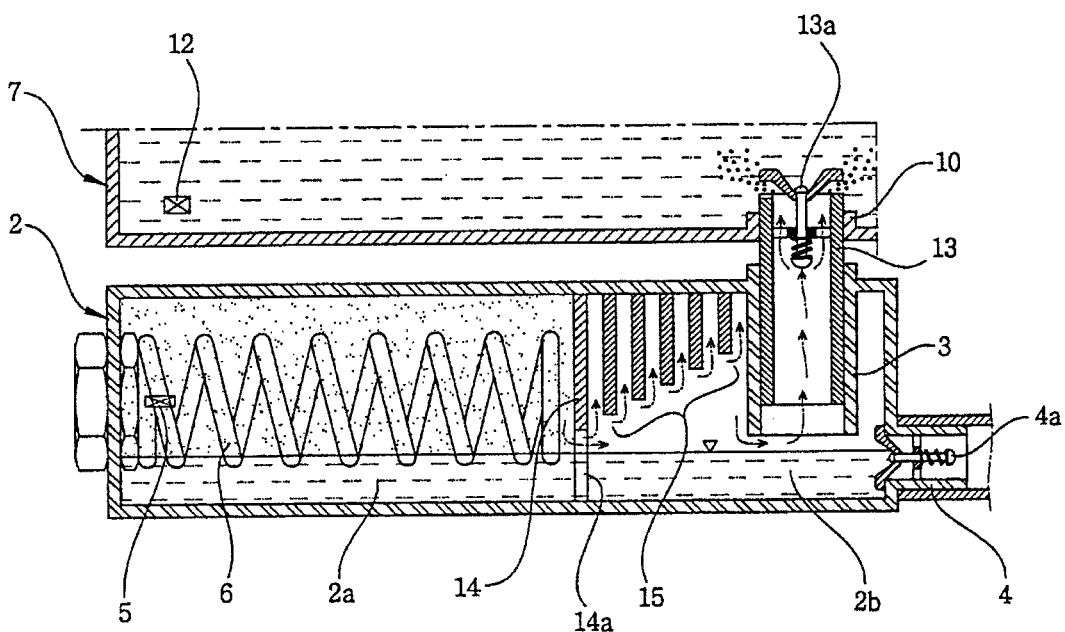

Described in detail, as shown in FIG. 4A, the hot water discharging port 3 of the hot water heating tank 2 is formed at a position higher than the position of the lower surface of the electric heater 6 (referred to height difference d in FIG. 4A), so, even when the electric heater 6 heats water and hot water is discharged from the tank 2 due to steam pressure, a desired amount of hot water remains on the bottom of the hot water heating tank 2 without being discharged to ensure a part of the electric heater 6 remains submerged, as shown in FIG. 4B. Here, when the electric heater 6 is heated continuously with the desired amount of water remaining on the bottom of the hot water heating tank 2, the water that is in contact with the electric heater 6 quickly expands, so expanded steam is discharged along with air from the hot water heating tank 2 via the hot water discharging port 3. Accordingly, even when air is introduced into the hot water heating tank 2 and remains in the tank 2, the present invention can efficiently expel the air from the tank 6 only by the heating operation of the electric heater 6.

Figure 5:
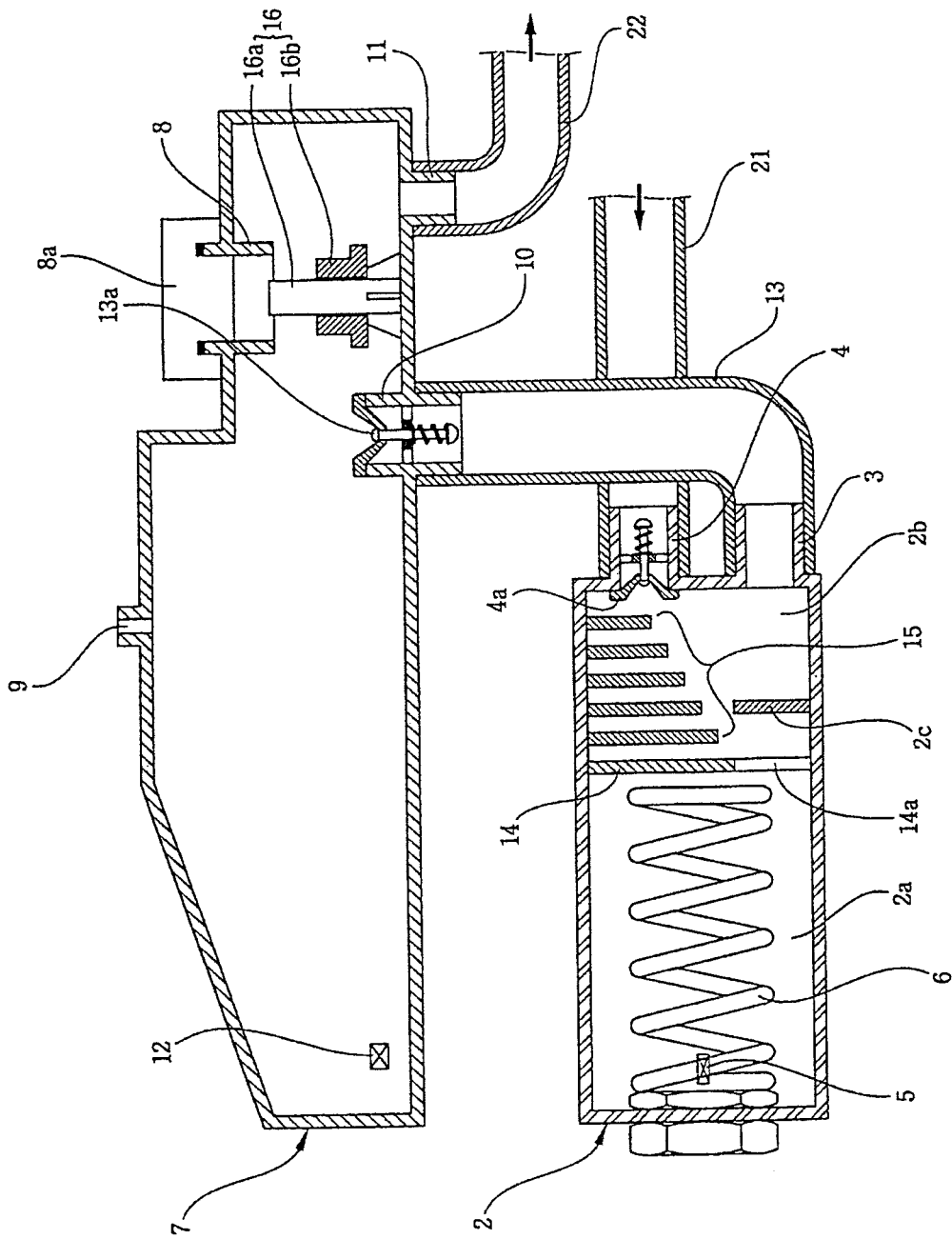
FIG. 5 is a sectional view illustrating the construction of a boiler for hot water heating mats according to a second embodiment of the present invention.

In another embodiment of the present invention, to ensure that a part of the electric heater 6 is always submerged under water inside the hot water heating tank 2, a retaining wall 2c for retaining hot water in the hot water heating tank 2 to a desired water level may be installed on the inner surface of the bottom of the hot water heating tank 2, as shown in FIG. 5, instead of forming the hot water discharging port 3 of the hot water heating tank 2 at a position higher than the position of the lower surface of the electric heater 6.

Figure 6A:
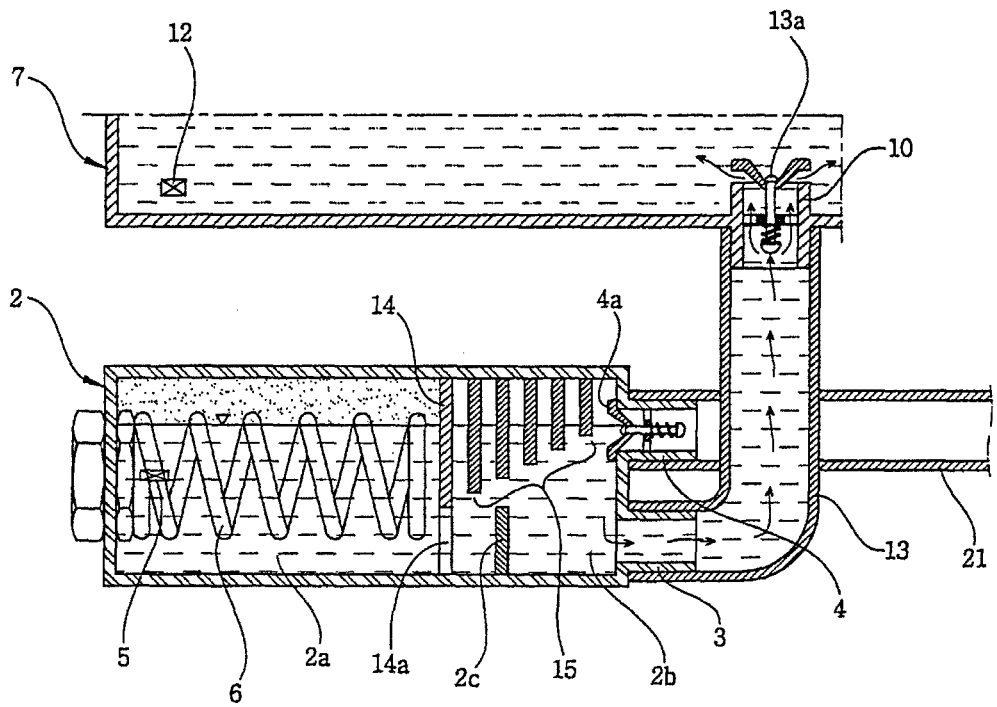
FIGS. 6A and 6B are sectional views illustrating an automatic air exhausting procedure of the boiler for hot water heating mats according to the second embodiment of the present invention.
Figure 6B:
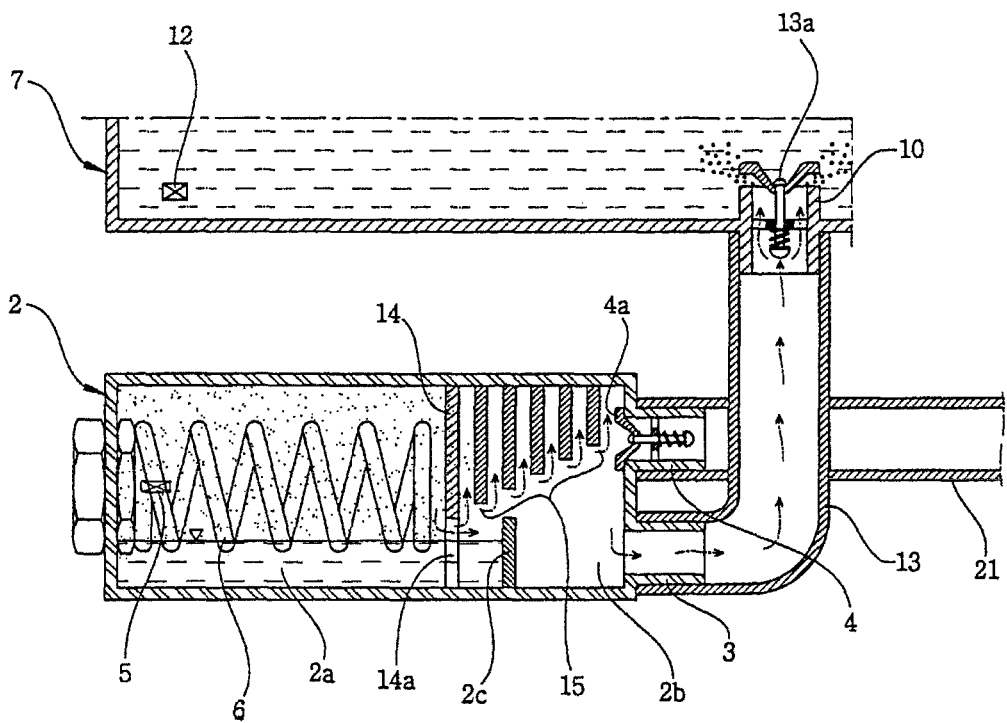

Due to the retaining wall 2c installed on the inner surface of the bottom of the hot water heating tank 2 as described above, even when the electric heater 6 heats water and hot water is discharged from the hot water heating tank 2 by steam pressure as shown in FIG. 6A, a desired amount of hot water is retained in the tank 2 by the retaining wall 2c without being discharged, and remains on the bottom of the hot water heating tank 2 to ensure that the heater 6 remains partially submerged, as shown in FIG. 6B. Here, when the electric heater 6 is heated continuously with the desired amount of hot water remaining on the bottom of the hot water heating tank 2, the water that is in contact with the electric heater 6 quickly expands, so expanded steam is discharged along with air from the hot water heating tank 2 via the hot water discharging port 3. Accordingly, even when air is introduced into the hot water heating tank 2 and remains in the tank 2, the present invention can efficiently expel the air from the tank 6 only by the heating operation of the electric heater 6.

In the present invention, the interior space of the hot water heating tank 2 may be divided by a steam/water separating wall 14 having a flow passage opening 14a on the lower end thereof into a hot water heating chamber 2a in which the electric heater 6 is installed and a hot water discharging chamber 2b in which the hot water discharging port 3 is formed.

Due to the division of the interior space of the hot water heating tank 2 into the hot water heating chamber 2a and the hot water discharging chamber 2b by the steam/water separating wall 14 having the flow passage opening 14a on the lower end, when the electric heater 6 heats water and hot water is discharged from the hot water heating tank 2 through the hot water discharging port 3 by steam pressure, it is possible to avoid noises that may be generated when the expanded steam is discharged along with hot water.

In other words, when the electric heater 6 heats water contained in the hot water heating tank 2, steam pressure is formed by expanded steam in the hot water heating chamber 2a separated from the hot water discharging chamber 2b by the steam/water separating wall 14, as shown in FIG. 4A or 6A. The steam pressure formed in the hot water heating chamber 2a by the expanded steam is not relieved via the hot water discharging port 3 due to the presence of the steam/water separating wall 14, but acts as a force pressurizing the hot water remaining in the hot water heating chamber 2a. Thus, the hot water flows from the hot water heating chamber 2a to the hot water discharging chamber 2b through the flow passage opening 14a formed on the lower end of the steam/water separating wall 14, so that hot water contained in the hot water discharging chamber 2b is pushed out of the hot water discharging chamber 2b. In other words, only the hot water is discharged via the hot water discharging port 3 in this case, so it is possible to avoid noises that may be generated when the expanded steam is discharged along with the hot water.

Further, a plurality of muffling walls 15 may be installed in the hot water heating tank 2 at spaced locations between the steam/water separating wall 14 and the hot water discharging port 3. The plurality of muffling walls 15 may extend downward from the inner surface of the upper wall of the hot water heating tank 2.

When the plurality of muffling walls 15 are installed in the hot water heating tank 2 at the spaced locations between the steam/water separating wall 14 and the hot water discharging port 3 in such a way that the muffling walls 15 extend downward from the inner surface of the upper wall of the hot water heating tank 2 as described above, it is possible to greatly attenuate noises that may be generated when only the expanded steam is discharged after only the hot water contained both in the hot water heating chamber 2a and in the hot water discharging chamber 2b is discharged from the chambers 2a and 2b due to steam pressure formed in the hot water heating chamber 2a.

In other words, when some of the hot water contained both in the hot water heating chamber 2a and in the hot water discharging chamber 2b is discharged from the chambers 2a and 2b through the hot water discharging port 3 due to the steam pressure formed in the hot water heating chamber 2a as shown in FIG. 4A or 6A, the water level inside the hot water heating chamber 2a is reduced as shown in FIG. 4B or FIG. 6B. Accordingly, the expanded steam formed in the hot water heating chamber 2a flows from the hot water heating chamber 2a into the hot water discharging chamber 2b via the flow passage opening 14a of the steam/water separating wall 14 prior to being discharged from the hot water discharging chamber 2b through the hot water discharging port 3. In the above state, the expanded steam flowing into the hot water discharging chamber 2b repeatedly collides with the plurality of spaced muffling walls 15 prior to being discharged through the hot water discharging port 3, so the expanded steam loses a great amount of energy prior to being discharged through the hot water discharging port 3. Thus, when the expanded steam having greatly lessened energy is discharged through the hot water discharging port 3, it is possible to greatly reduce the noises that may be generated by the discharging of the expanded steam through the hot water discharging port 3.

The water level sensor 5 installed in the hot water heating tank 2 functions to detect the water level inside the hot water heating tank 2 so as to turn the electric heater 6 on or off. Here, a conventional floating water level sensor or a conventional electromagnetic water level sensor typically used in a humidifier or in an aquarium may be used as the water level sensor 5. According to the recent trend of slimness of the boiler 1, the interior space of the hot water heating tank 2 of the boiler 1 is limited, so, to easily install the water level sensor 5 in the limited space of the hot water heating tank 2, the electromagnetic water level sensor having a small volume is preferred to the floating water level sensor having a large volume.

Further, the electric heater 6 installed in the hot water heating tank 2 may be selected from a conventional bar-shaped electric heater or a conventional coil-shaped electric heater. Here, the heating space inside the hot water heating tank 2 becomes limited according to the recent trend of slimness of the boiler 1, so, to realize maximum heating efficiency in the limited heating space of the hot water heating tank 2, the coil-shaped electric heater is preferred to the bar-shaped electric heater.

The hot water storage tank 7 is connected to the hot water heating tank 2 and stores therein hot water discharged from the hot water heating tank 2. A water charging port 8 and an air exhausting port 9 are formed on predetermined outside portions of the hot water storage tank 7. Here, the water charging port 8 is opened or closed by a cap 8a. A hot water inlet port 10 and a hot water outlet port 11 are formed on other predetermined outside portions of the hot water storage tank 7. Here, the hot water inlet port 10 of the hot water storage tank 7 is connected to the hot water discharging port 3 of the hot water heating tank 2, and the hot water outlet port 11 may be connected to the hot water heating mat. Further, a water deficiency sensor 12 is installed inside the hot water storage tank 7.

In the hot water storage tank 7, the cap 8a functions to open or close the water charging port 8 formed on the upper wall of the hot water storage tank 7. Here, the cap 8a may be tightened to the hot water storage tank 7 by screw engagement or by a locking engagement using both a locking protrusion and a locking groove, with a sealing material interposed between the inner surface of the cap 8a and the upper end of the water charging port 8.

The water deficiency sensor 12 installed in the hot water storage tank 7 functions to detect the water level inside the hot water storage tank 7. Here, a conventional floating water level sensor or a conventional electromagnetic water level sensor typically used in a humidifier or in an aquarium may be used as the water deficiency sensor 12. The interior space of the hot water storage tank 7 of the boiler 1 is limited according to the recent trend of slimness of the boiler 1, so, to easily install the water deficiency sensor 12 in the limited space of the hot water storage tank 7, the electromagnetic water level sensor having a small volume is preferred to the floating water level sensor having a large volume.

Further, an overcharging prevention unit 16 may be provided on a position directly below the water charging port 8 of the hot water storage tank 7. Here, the overcharging prevention unit 16 includes a guide rod 16a vertically installed on the inner surface of the bottom of the hot water storage tank 7 and a ring-shaped float 16b movably fitted over the guide rod 16a.

Figure 7A:
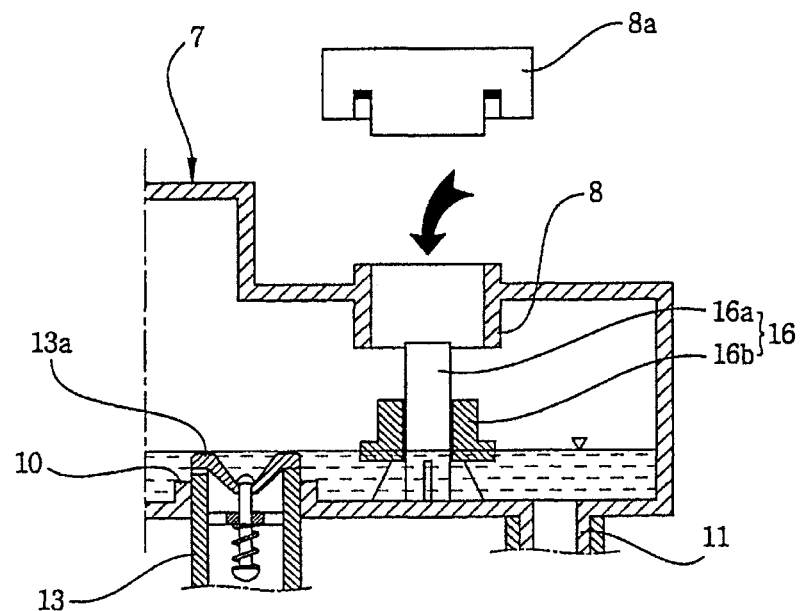
FIGS. 7A and 7B are sectional views illustrating the operation of an overcharging prevention unit provided in the boiler for hot water heating mats according to the present invention.
Figure 7B:
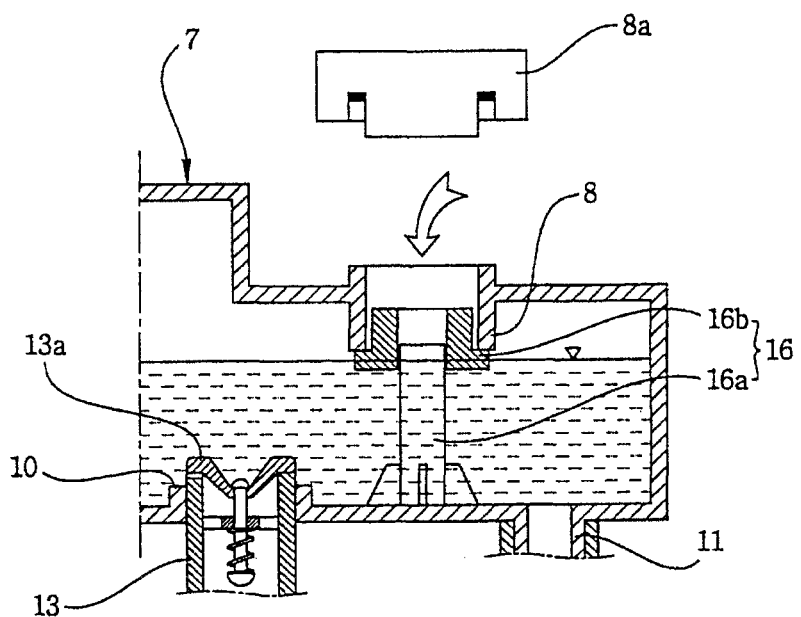

The overcharging prevention unit 16 including the guide rod 16a and the ring-shaped float 16b installed at the position directly below the water charging port 8 of the hot water storage tank 7 is operated as follows. When a user charges water in the hot water storage tank 7 as shown in FIGS. 7A and 7B, the float 16b fitted over the guide rod 16a moves upward along the guide rod 16a according to an increase in the water level inside the tank 7, so the user can easily know the amount of charged water. Further, in this case, the lower end of the water charging port 8 can be automatically closed by the float 16b, so it is possible to prevent the boiler from malfunctioning due to overcharging of water.

The function of the hot water discharging check valve 13a is to allow hot water formed in the hot water heating tank 2 to flow into the hot water storage tank 7 while preventing hot water stored in the hot water storage tank 7 from flowing reversely into the hot water heating tank 2. Here, the hot water discharging check valve 13a may be installed on the hot water discharging port 3 of the hot water heating tank 2, the hot water inlet port 10 of the hot water storage tank 7 or the connection pipe 13 that connects the hot water discharging port 3 of the hot water heating tank 2 to the hot water inlet port 10 of the hot water storage tank 7 as desired when designing the boiler.

The hot water recovering check valve 4a is an element that is installed on the hot water recovering port 4 of the hot water heating tank 2. The function of the hot water recovering check valve 4a is to allow hot water to flow from the hot water heating mat into the hot water heating tank 2 while preventing hot water formed in the hot water heating tank 2 from flowing into the hot water heating mat.

Figure 3:
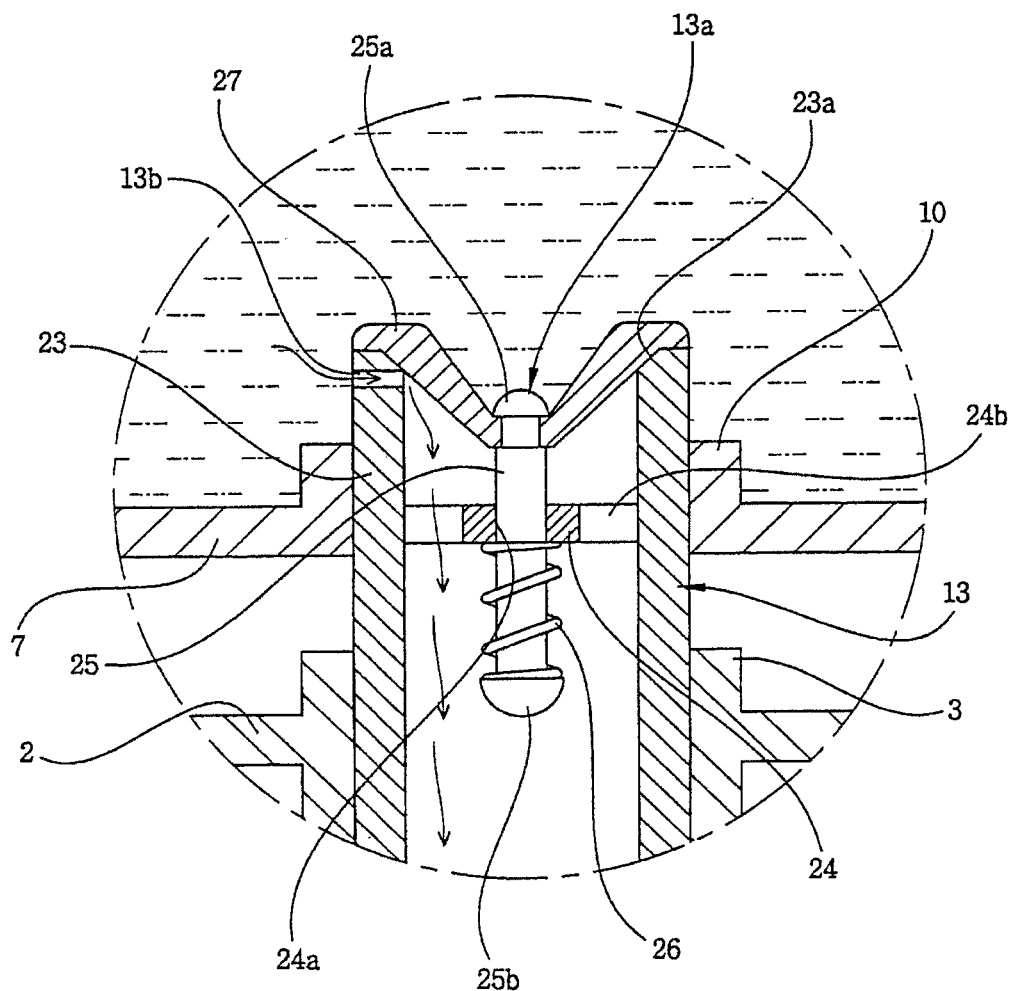
FIG. 3 is an enlarged view of portion A of FIG. 2.

Here, as shown in FIG. 3, each of the hot water discharging check valve 13a and the hot water recovering check valve 4a may include: a cylindrical valve housing 23 having a valve seat 23a on a first end thereof; a pin support 24 formed in the valve housing 23, with a pin insert hole 24a formed through the center of the pin support 24, and with a plurality of through holes 24b formed through the pin support 24 at positions around the pin insert hole 24a; a disc support pin 25 inserted into the pin insert hole 24a of the pin support 24, with a disc stopper 25a formed on a first end of the disc support pin 25, and with a spring stopper 25b formed on a second end of the disc support pin 25; a coil spring 26 fitted over the outer circumferential surface of the disc support pin 25 and placed between the pin support 24 and the spring stopper 25b of the disc support pin 25; and a valve on/off disc 27 locked to the disc stopper 25a of the disc support pin 25 and brought into close contact with the valve seat 23a of the valve housing 23 by elasticity of the coil spring 26.

The above-mentioned construction of each of the hot water discharging check valve 13a and the hot water recovering check valve 4a is simple, so it is easy to manufacture the check valves. Further, when each of the check valves 4a and 13a is closed by the elasticity of the coil spring 26, the check valves 4a and 13a can realize desired sealing effects, thereby efficiently preventing reverse flow of fluid. In addition, the check valves 4a and 13a do not greatly restrict fluid, so, when the check valves 4a and 13a are opened, hot water can easily pass through the check valves 4a and 13a.

Further, a reverse flow hole 13b having a fine size may be formed in the hot water inlet port 10 of the hot water storage tank 7 or in the connection pipe 13 connecting the hot water discharging port 3 of the hot water heating tank 2 to the hot water inlet port 10 of the hot water storage tank 7, so, even when the check valve 13a is closed, the reverse flow hole 13b allows water stored in the hot water storage tank 7 to flow reversely from the hot water storage tank 7 into the hot water heating tank 2 by a small amount.

The function of the reverse flow hole 13b is as follows. During the operation of the boiler, air is continuously introduced into the hot water heating tank 2 after air is discharged from the hot water heating tank 2 along with expanded steam by the heating operation of the electric heater 6. Further, water remaining on the bottom of the hot water heating tank 2 expands to become steam by the heating operation of the electric heater 6, and the amount of water remaining on the bottom of the hot water heating tank 2 may be gradually reduced. The reverse flow hole 13b is provided to prevent such a reduction in the amount of water remaining in the hot water heating tank 2. That is, in that case, a vacuum suction force is formed in the hot water heating tank 2 and water stored in the hot water storage tank 7 is drawn reversely from the hot water storage tank 7 into the hot water heating tank 2 via the reverse flow hole 13b by a small amount due to the vacuum suction force, so that water remaining on the bottom of the hot water heating tank 2 can always be maintained at a desired level.

Further, an electric circuit of the boiler for hot water heating mats according to the present invention is configured as follows. In the electric circuit, an electric cord connected to an AC 220V power source is connected to a controller, with the interposition of both an anti-overheating bimetal sensor for automatically cutting a power supplying when the electric heater is overheated and an overturn sensor for automatically cutting the power supplying when the boiler is overturned. The controller is also connected to the water level sensor 5 and the electric heater 6 installed in the hot water heating tank 2, the water deficiency sensor 12 installed in the hot water storage tank 7, a water deficiency alarm lamp that is turned on when a low water level inside the hot water storage tank 7 is detected, and an anti-overheating temperature sensor installed on the outside upper part of the hot water heating tank 2.

The operation of the above-mentioned boiler for hot water heating mats according to the present invention will be described hereinbelow.

Figure 1:
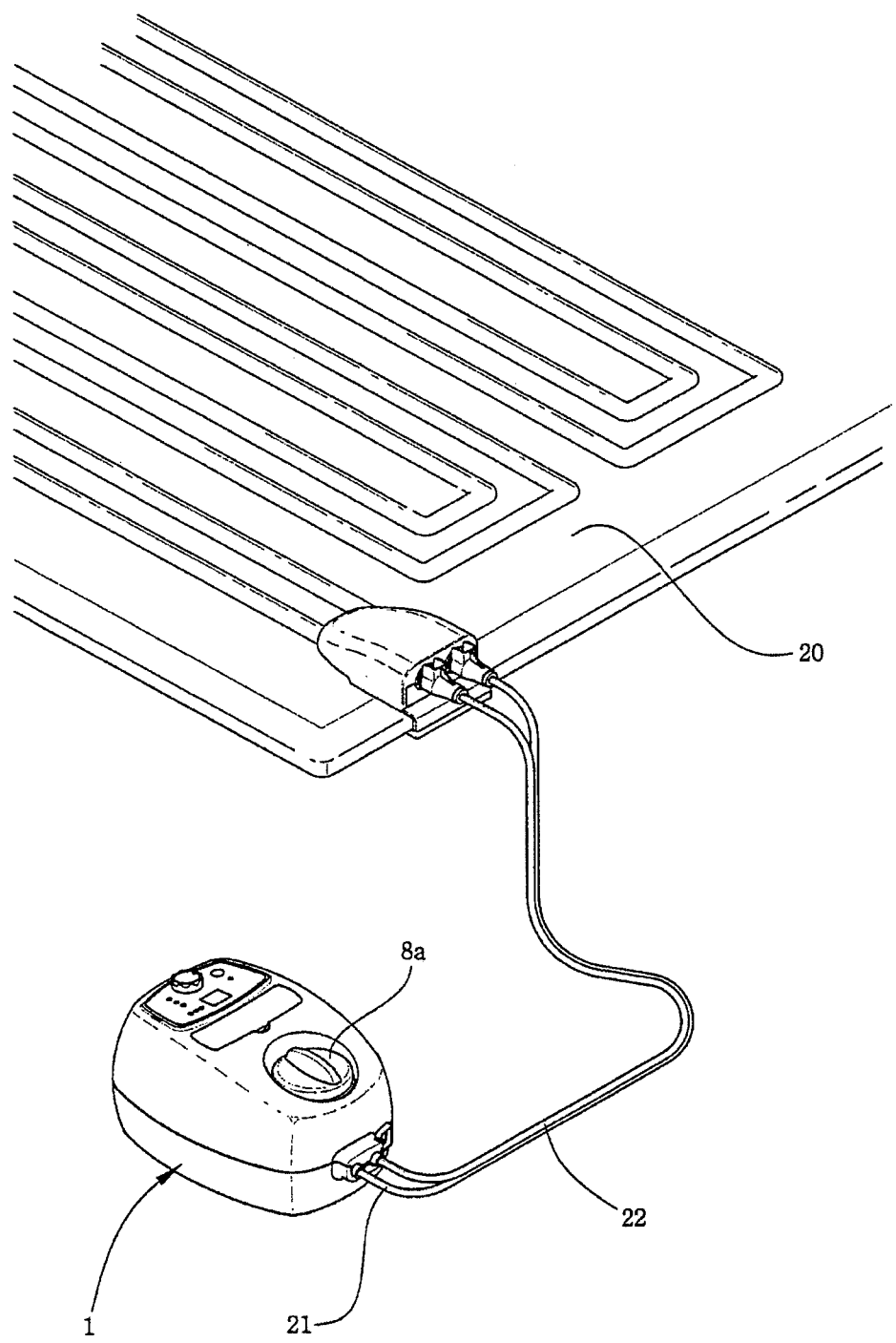
FIG. 1 is a perspective view illustrating use of a boiler for hot water heating mats according to the present invention when the boiler is used with a hot water heating mat.

As shown in FIG. 1, the boiler for hot water heating mats according to the present invention is used with a hot water heating mat 20 connected to the boiler 1 using a pair of connecting hoses 21 and 22. When turning on a power switch of the boiler 1 connected to the hot water heating mat 20 using the pair of connecting hoses 21 and 22, the water deficiency alarm lamp is turned on in an initial stage of the operation of the boiler 1 because a sufficient amount of water is not charged in the boiler 1 in the initial stage.

Figure 8A:
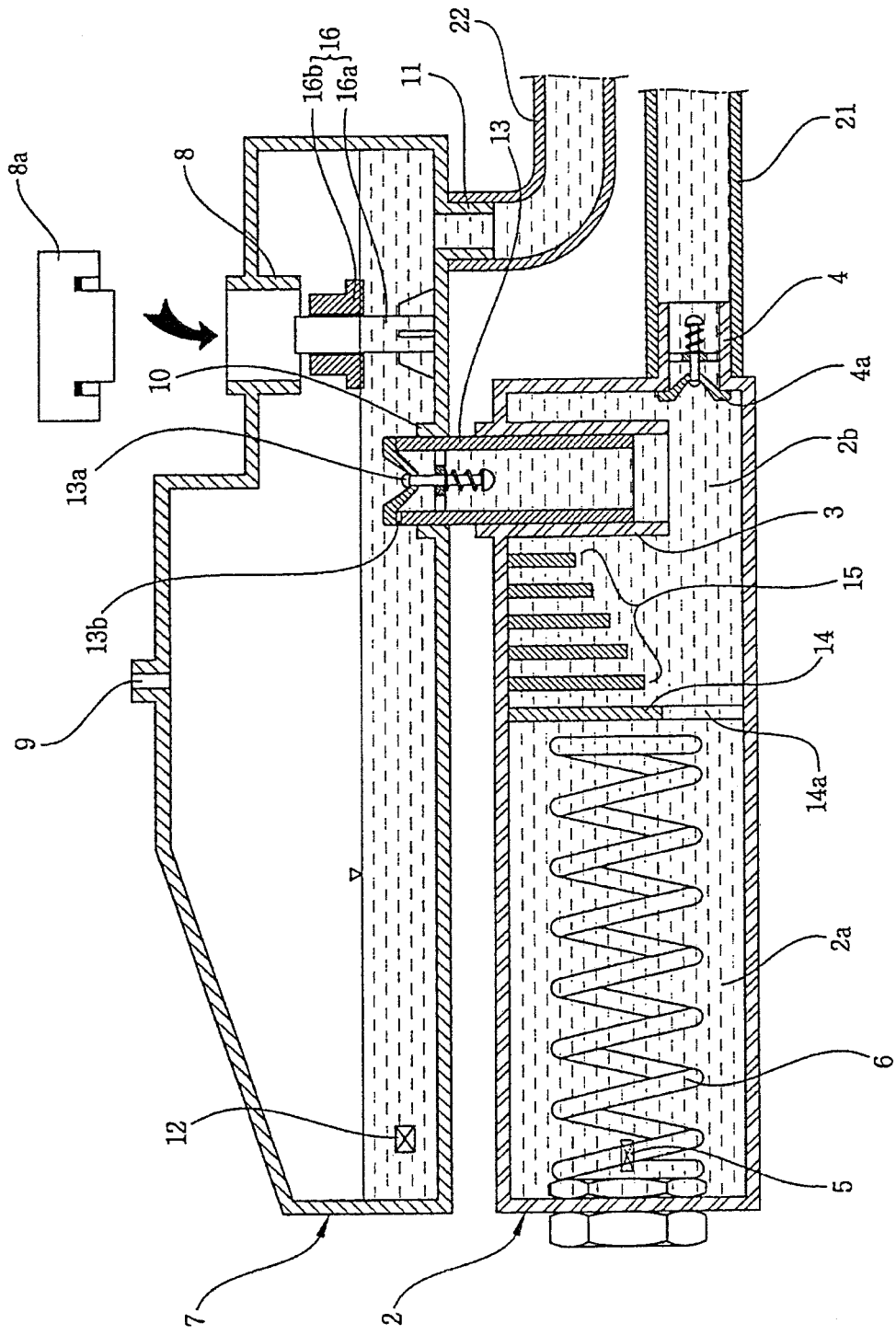
FIGS. 8A to 8E are views illustrating the operation of the boiler for hot water heating mats according to the present invention.

To charge water in the boiler 1 in the above state, as shown in FIG. 8A, the connecting hose 22 is disconnected from the hot water outlet port 11 formed in the lower wall of the hot water storage tank 7. Thereafter, water is charged in both the hot water heating mat 20 and in the boiler 1 through the end of the disconnected connecting hose 22. Here, to inject water into the end of the connecting hose 22, a conventional manual water pump or a specifically manufactured water injection unit may be used.

When water is injected using the connecting hose 22 disconnected from the hot water outlet port 11 of the hot water storage tank 7 as described above, the hot water circulation hose installed in the hot water heating mat 20 is primarily filled with the injected water. Thereafter, the water flows into the hot water heating tank 2 after opening the hot water recovering check valve 4a installed in the hot water recovering port 4 of the hot water heating tank 2, so the hot water heating tank 2 is filled with water.

Thereafter, the connecting hose 22 is connected to the hot water outlet port 11 of the hot water storage tank 7, and the cap 8a is removed from the water charging port 8 formed in the upper wall of the hot water storage tank 7. After opening the cap 8a, water is charged in the hot water storage tank 7 to a predetermined water level such that the water deficiency alarm lamp is turned off. After confirming the water deficiency alarm lamp turned off, the cap 8a is tightened to the water charging port 8, thereby finishing the charging of water in the boiler 1.

In the above state, due to the overcharging prevention unit 16 that includes the guide rod 16a and the ring-shaped float 16b and is installed at the position directly below the water charging port 8 of the hot water storage tank 7, when a user charges water in the hot water storage tank 7 as shown in FIGS. 7A and 7B, the float 16b movably fitted over the guide rod 16a moves upward along the guide rod 16a according to an increase in the water level inside the tank 7, so the user can easily know the amount of charged water. Further, the lower end of the water charging port 8 is automatically closed by the float 16b, so it is possible to prevent the boiler 1 from malfunctioning due to overcharging of water.

Figure 8B:
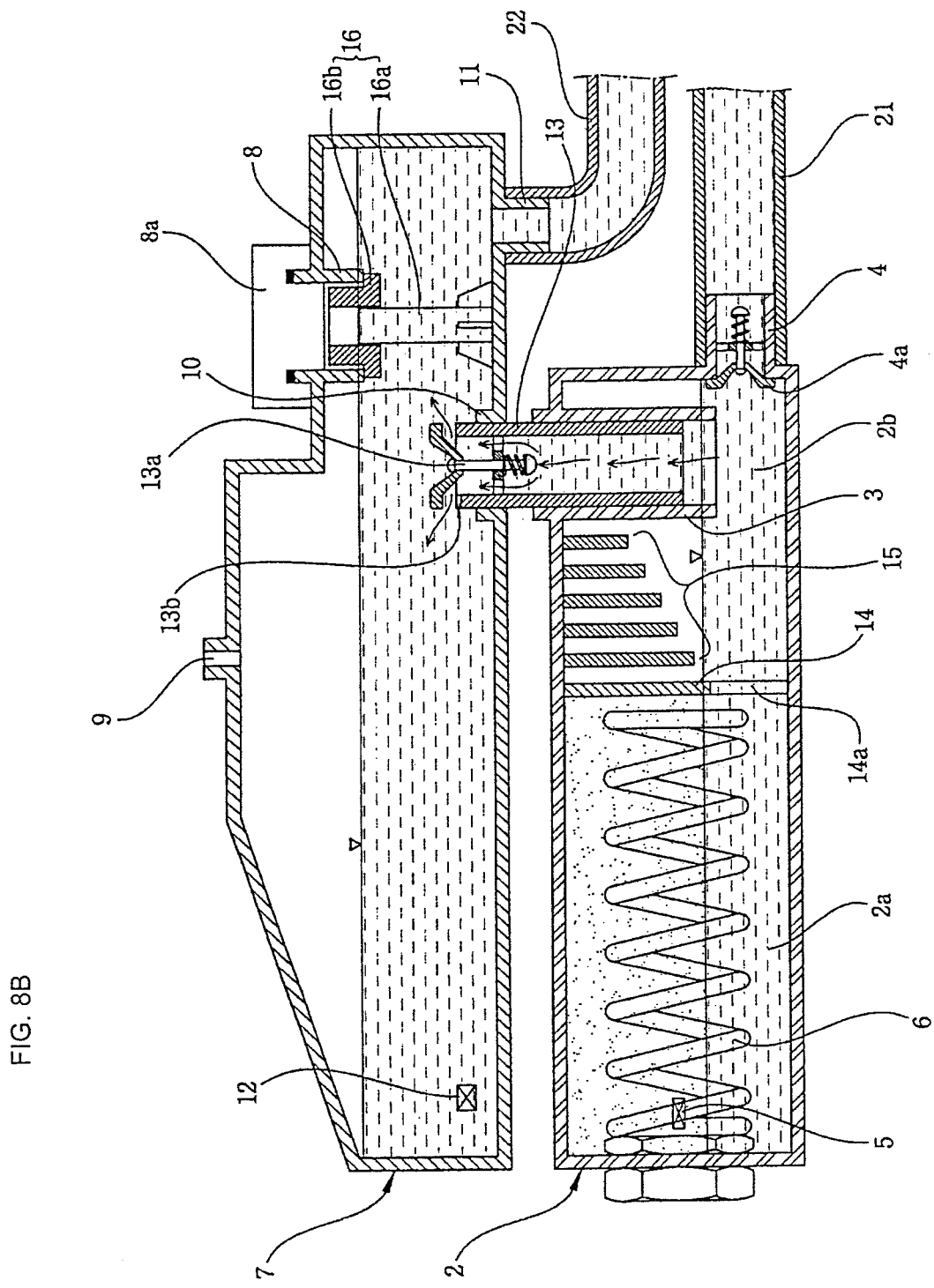

When water in the hot water heating tank 2 is heated by the electric heater 6 after finishing the charging of water in both the boiler 1 and the hot water heating mat 20, steam is generated in the hot water heating tank 2 and steam pressure inside the hot water heating tank 2 is increased, so, as shown in FIG. 8B, the closed state of the hot water recovering check valve 4a provided in the hot water recovering port 4 is further enhanced due to the increased steam pressure inside the hot water heating tank 2. Therefore, the flow passage defined in the hot water recovering port 4 is firmly closed, so hot water formed in the hot water heating tank 2 is discharged only through the hot water discharging port 3 without being discharged through the hot water recovering port 4. In other words, the hot water opens the hot water discharging check valve 13a and flows into the hot water storage tank 7 via the hot water discharging port 3.

When hot water formed in the hot water heating tank 2 flows into the hot water storage tank 7 due to the steam pressure as described above, the water level inside the hot water heating tank 2 is gradually reduced. When the water level inside the hot water heating tank 2 is reduced to a level lower than the height of the water level sensor 5, the electric power supplied to the electric heater 6 is automatically cut by the controller after a predetermined period of time goes by, thereby stopping the operation of the electric heater 6.

Figure 8C:
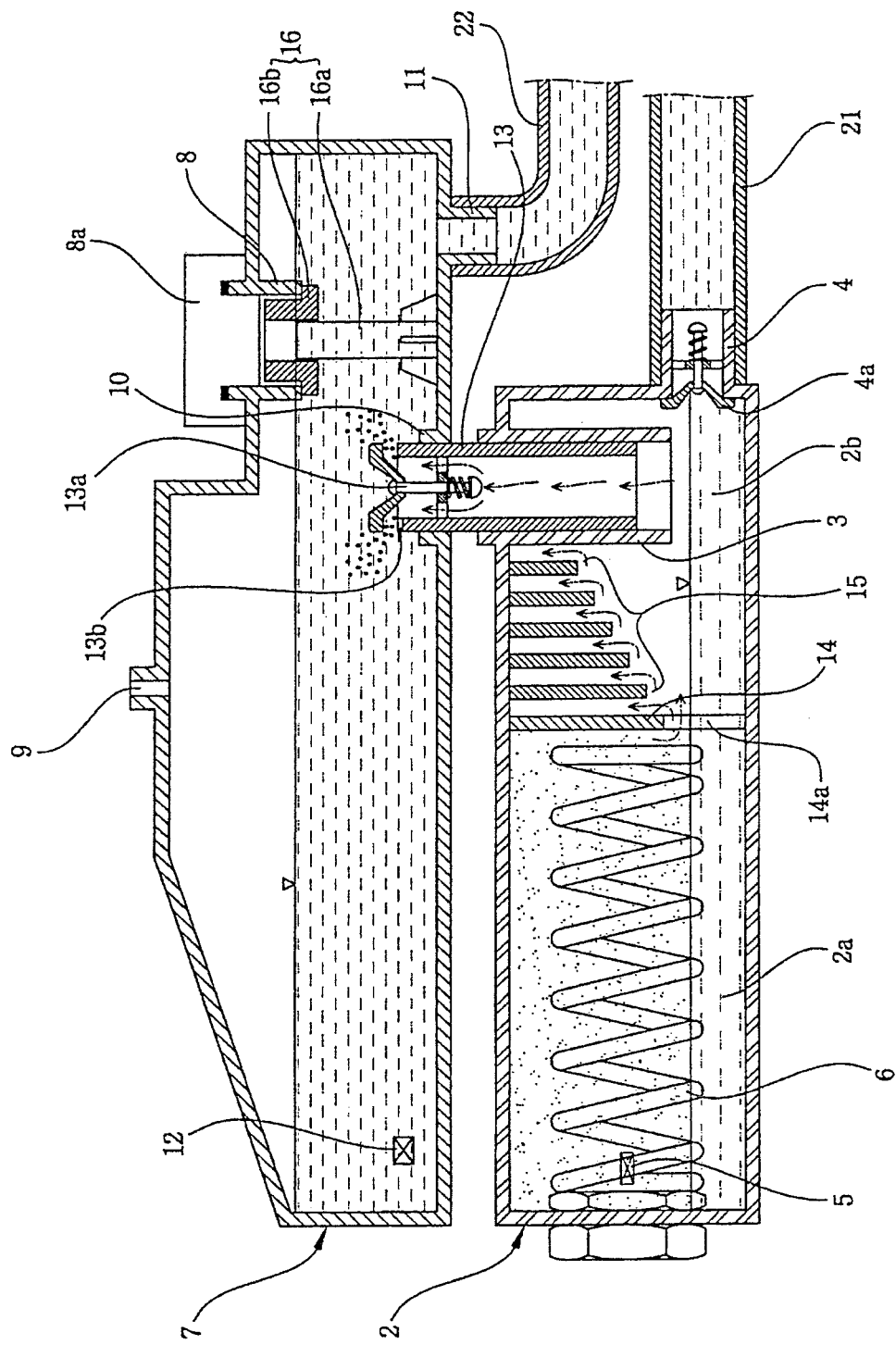

Here, the hot water discharging port 3 of the hot water heating tank 2 is formed at a location higher than the height of the lower surface of the electric heater 6, so, even when hot water formed in the hot water heating tank 2 is discharged due to the steam pressure, a desired amount of water remains on the bottom of the hot water heating tank 2 without being discharged to ensure that the electric heater 6 remains partially submerged, as shown in FIG. 8C. When the electric heater 6 is heated, with the desired amount of water remaining on the bottom of the hot water heating tank 2 without being discharged to ensure that the electric heater 6 remains partially submerged, for the predetermined period of time from a time the water level sensor 5 senses the reduction in the water level inside the hot water heating tank 2 to a time the electric power supplied to the electric heater 6 is cut by the controller, the water that is in contact with the electric heater 6 is heated and expands quickly to form expanded steam. The expanded steam is discharged from the hot water heating tank 2 through the hot water discharging port 3 along with air that has been introduced into the hot water heating tank 2. Accordingly, even when air is introduced into the hot water heating tank 2, the present invention can easily expel the air from the hot water heating tank 2 only by the heating operation of the electric heater 6.

Further, in the present invention, the interior space of the hot water heating tank 2 is divided by the steam/water separating wall 14 having the flow passage opening 14a on the lower end thereof into the hot water heating chamber 2*a* in which the electric heater 6 is installed and the hot water discharging chamber 2*b* in which the hot water discharging port 3 is formed. Thus, when the electric heater 6 heats water inside the hot water heating tank 2 and hot water is discharged from the tank 2 through the hot water discharging port 3 due to steam pressure, the present invention can avoid noises that may be generated by the discharging of expanded steam along with the hot water.

In addition, in the present invention, the plurality of muffling walls 15 are installed in the hot water heating tank 2 at the spaced locations between the steam/water separating wall 14 and the hot water discharging port 3 in such a way that the muffling walls 15 extend downward from the inner surface of the upper wall of the hot water heating tank 2. Thus, the present invention greatly attenuates noises that may be generated when only expanded steam is discharged after only the hot water contained both in the hot water heating chamber 2*a* and in the hot water discharging chamber 2*b* is discharged from the chambers 2*a* and 2*b* due to steam pressure formed in the hot water heating chamber 2*a*.

Figure 8D:
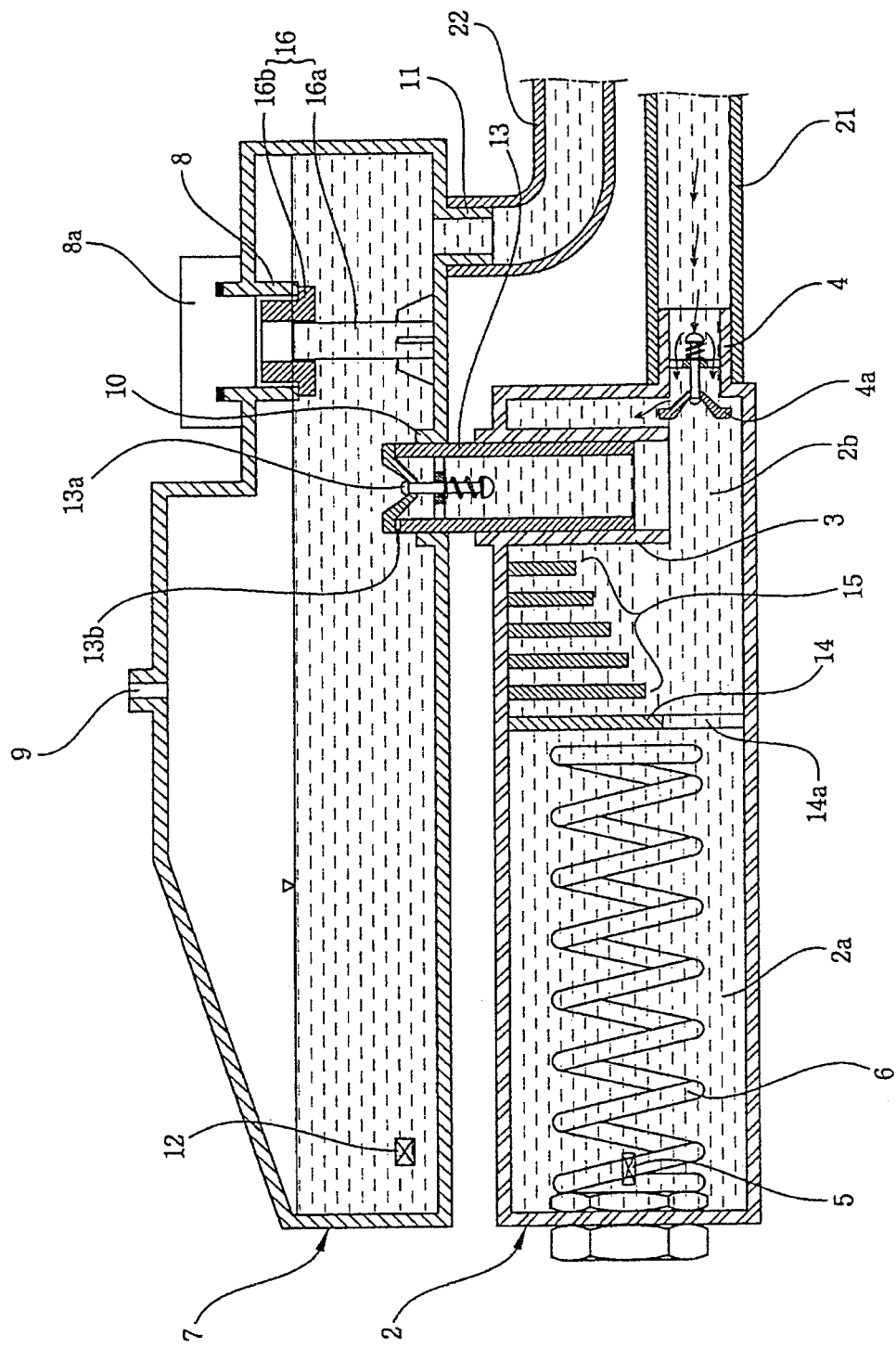

When the electric power supplied to the electric heater 6 is automatically cut and the heating operation of the electric heater 6 is stopped after air that has been introduced into the hot water heating tank 2 is discharged from the tank 2 along with expanded steam via the hot water discharging port 3 during the heating operation of the electric heater 6, the steam formed in the hot water heating tank 2 is recovered into water and pressure inside the hot water heating tank 2 is quickly reduced to form a vacuum in the hot water heating tank 2*d*. When the interior of the hot water heating tank 2 is vacuumized as described above, a high suction force is formed in the tank 2 and, as shown in FIG. 8D, hot water contained in the hot water heating mat 20 is drawn into the hot water heating tank 2 via the hot water recovering port 4 of the hot water heating tank 2.

Here, when the interior of the hot water heating tank 2 is vacuumized as described above, the hot water discharging check valve 13*a* is strongly closed due to the vacuum suction force formed in the hot water heating tank 2 and the passage defined in the hot water discharging port 3 is completely closed, so no hot water stored in the hot water storage tank 7 is drawn into the hot water heating tank 2 via the hot water discharging port 3.

Further, when the reverse flow hole 13*b* having a fine size is formed in the hot water inlet port 10 of the hot water storage tank 7 or in the connection pipe 13 connecting the hot water discharging port 3 of the hot water heating tank 2 to the hot water inlet port 10 of the hot water storage tank 7, water stored in the hot water storage tank 7 is drawn into the hot water heating tank 2 via the reverse flow hole 13*b* by a small amount due to the vacuum suction force formed in the hot water heating tank 2. Thus, water remaining on the bottom of the hot water heating tank 2 can always maintain a desired water level such that the electric heater 6 installed in the hot water heating tank 2 can remain partially submerged in water, so the present invention can prevent the interior of the hot water heating tank 2 from being overheated due to shortage of water.

Figure 8E:
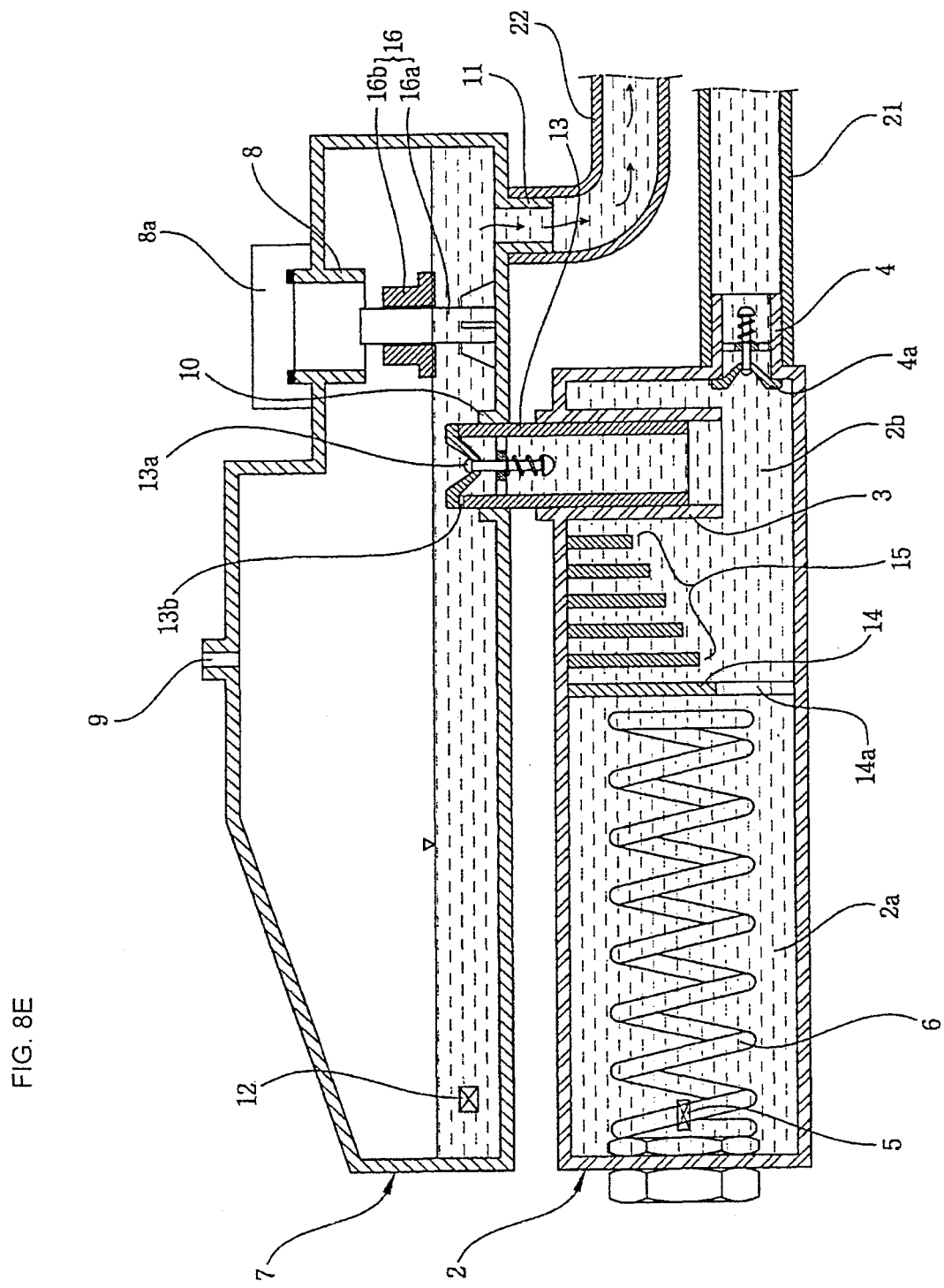
Figure 9:
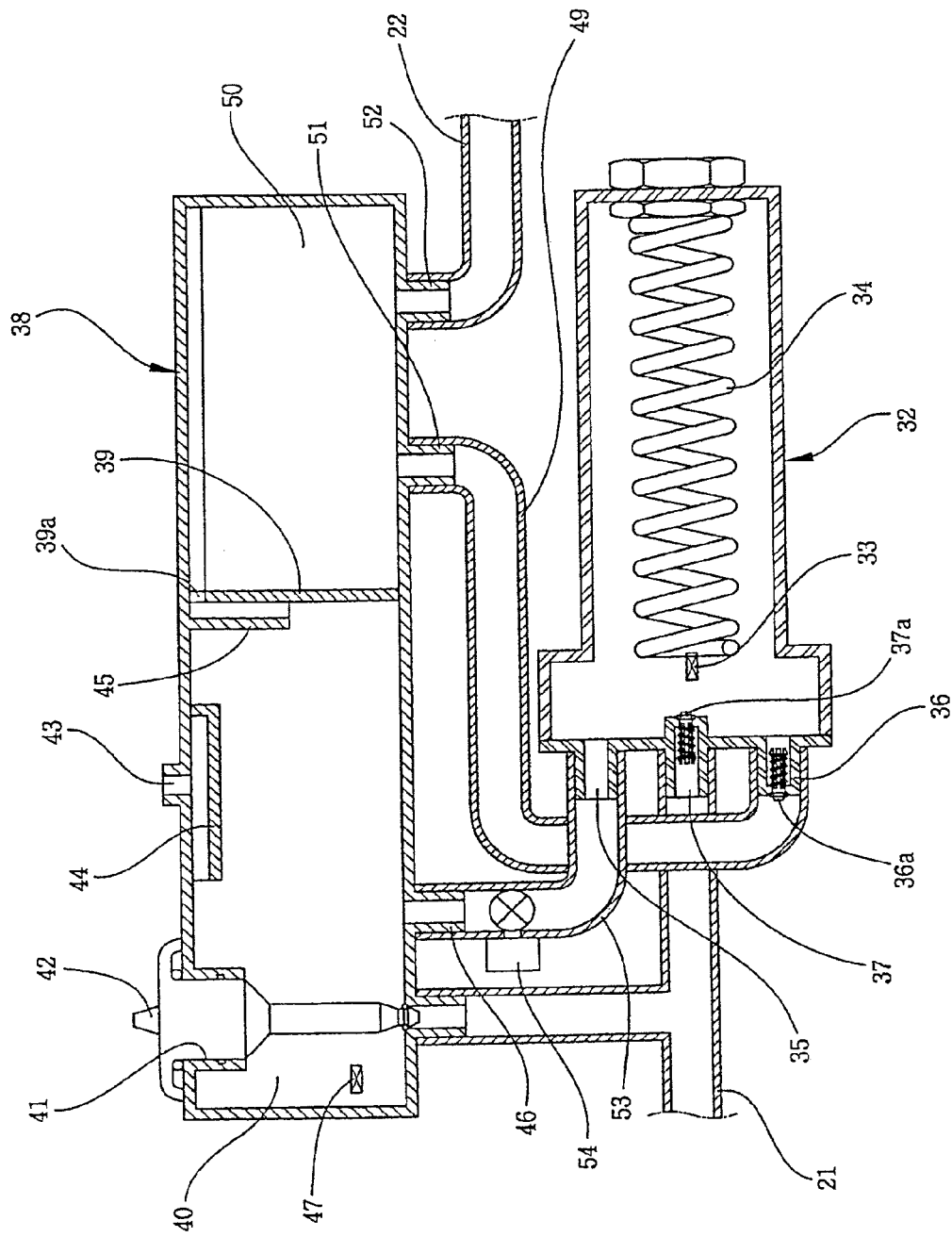
FIG. 9 is a sectional view illustrating the construction of a conventional boiler for hot water heating mats.

When hot water contained in the hot water heating mat 20 is drawn into the hot water heating tank 2 due to the vacuum suction force formed the hot water heating tank 2 as described above, the interior of the hot water heating mat 20 is gradually vacuumized and a high level of vacuum suction force is formed in the hot water heating mat 20. Due to the vacuum suction force formed in the hot water heating mat 20, hot water stored in the hot water storage tank 7 is drawn into the hot water heating mat 20 via the hot water outlet port 11 as shown in FIG. 8E, so hot water can circulate in the hot water heating mat 20.

When hot water contained in the hot water heating mat 20 is drawn into the hot water heating tank 2 due to the vacuum suction force formed the hot water heating tank 2, the water level inside the hot water heating tank 2 is increased to reach the height of the water level sensor 5. When the water level inside the hot water heating tank 2 reaches the height of the water level sensor 5, the controller supplies electricity to the electric heater 6 installed in the hot water heating tank 2 after a predetermined period of time goes by, so the electric heater 6 is operated and the above-mentioned hot water circulation process is repeated.

As described above, in the boiler for hot water heating mats according to the present invention, an electric heater 6 is installed horizontally or inclinedly in a hot water heating tank 2, with a hot water discharging port 3 of the hot water heating tank 2 formed at a height higher than the height of the lower surface of the electric heater 6 or with a retaining wall 2*c* installed on the inner surface of the bottom of the hot water heating tank 2 so that, even when hot water heated by the electric heater 6 is discharged from the hot water heating tank 2 to a hot water storage tank 7 due to steam pressure formed in the hot water heating tank 2, a desired amount of hot water remains on the bottom of the hot water heating tank 2 without being discharged to ensure that a part of the electric heater 6 remains submerged. Accordingly, the boiler of this invention can automatically exhaust air along with expanded steam from the hot water heating tank 2 only by a heating operation of the electric heater 6 without using a conventional air exhausting solenoid valve that may be frequently broken due to a repeated operation thereof in a high temperature hot water environment, so the present invention can efficiently prevent a reduction in the amount of circulated hot water or an interruption of the circulation of hot water, which may be caused by air remaining in the hot water heating tank 2, and can realize improved durability of the boiler by solving various problems caused by the conventional air exhausting solenoid valve.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A boiler for hot water heating mats, comprising:
   a hot water heating tank, with a hot water discharging port formed on a predetermined outside portion of the hot water heating tank, a hot water recovering port formed on another predetermined portion of the hot water heating tank so as to connect the hot water heating tank to a hot water heating mat, and a water level sensor and an electric heater installed inside the hot water heating tank;
   a hot water storage tank connected to the hot water heating tank, with a water charging port formed on a predetermined outside portion of the hot water storage tank and opened or closed by a cap, an air exhausting port formed on another predetermined outside portion of the hot water storage tank, a hot water inlet port and a hot water outlet port formed on other predetermined outside portions of the hot water storage tank so as to be connected to the hot water discharging port of the hot water heating tank and to the hot water heating mat, respectively, and a water deficiency sensor installed inside the hot water storage tank;

a hot water discharging check valve installed on the hot water discharging port of the hot water heating tank, the hot water inlet port of the hot water storage tank or a connection pipe connecting the hot water discharging port of the hot water heating tank to the hot water inlet port of the hot water storage tank; and a hot water recovering check valve installed on the hot water recovering port of the hot water heating tank, wherein the electric heater is installed horizontally or inclinedly in the hot water heating tank;

the hot water discharging port of the hot water heating tank is formed at a height higher than a height of a lower surface of the electric heater so that part of the electric heater remains submerged in water; and an interior space of the hot water heating tank is divided by a steam/water separating wall having a flow passage opening on a lower end thereof into a hot water heating chamber in which the electric heater is installed and a hot water discharging chamber in which the hot water discharging port is formed.

2. The boiler for hot water heating mats according to claim 1, wherein a plurality of muffling walls are installed in the hot water heating tank at spaced locations between the steam/water separating wall and the hot water discharging port, the muffling walls extending downward from an inner surface of an upper wall of the hot water heating tank.

3. The boiler for hot water heating mats according to claim 1, wherein a reverse flow hole having a fine size is formed in the hot water inlet port of the hot water storage tank or in the connection pipe connecting the hot water discharging port of the hot water heating tank to the hot water inlet port of the hot water storage tank, the reverse flow hole allowing water stored in the hot water storage tank to flow reversely from the hot water storage tank into the hot water heating tank.

4. The boiler for hot water heating mats according to claim 1, wherein each of the hot water discharging check valve and the hot water recovering check valve comprises:
 a cylindrical valve housing having a valve seat on a first end thereof;
 a pin support formed in the valve housing, with a pin insert hole formed through a center of the pin support and with a plurality of through holes formed through the pin support at positions around the pin insert hole;
 a disc support pin inserted into the pin insert hole of the pin support, with a disc stopper formed on a first end of the disc support pin and a spring stopper formed on a second end of the disc support pin;
 a coil spring fitted over an outer circumferential surface of the disc support pin and placed between the pin support and the spring stopper of the disc support pin; and
 a valve on/off disc combined with the disc stopper of the disc support pin and brought into close contact with the valve seat of the valve housing by elasticity of the coil spring.

5. The boiler for hot water heating mats according to claim 1, wherein an overcharging prevention unit is provided on a position below the water charging port of the hot water storage tank, the overcharging prevention unit comprising:
 a guide rod vertically installed on the inner surface of the bottom of the hot water storage tank, and a ring-shaped float movably fitted over the guide rod.

6. A boiler for hot water heating mats, comprising:
 a hot water heating tank, with a hot water discharging port formed on a predetermined outside portion of the hot water heating tank, a hot water recovering port formed on another predetermined portion of the hot water heating tank so as to connect the hot water heating tank to a hot water heating mat, and a water level sensor and an electric heater installed inside the hot water heating tank;
 a hot water storage tank connected to the hot water heating tank, with a water charging port formed on a predetermined outside portion of the hot water storage tank and opened or closed by a cap, an air exhausting port formed on another predetermined outside portion of the hot water storage tank, a hot water inlet port and a hot water outlet port formed on other predetermined outside portions of the hot water storage tank so as to be connected to the hot water discharging port of the hot water heating tank and to the hot water heating mat, respectively, and a water deficiency sensor installed inside the hot water storage tank;
 a hot water discharging check valve installed on the hot water discharging port of the hot water heating tank, the hot water inlet port of the hot water storage tank or a connection pipe connecting the hot water discharging port of the hot water heating tank to the hot water inlet port of the hot water storage tank; and
 a hot water recovering check valve installed on the hot water recovering port of the hot water heating tank, wherein
 the electric heater is installed horizontally or inclinedly in the hot water heating tank;
 a retaining wall for retaining hot water in the hot water heating tank is installed on an inner surface of a bottom of the hot water heating tank so that a part of the electric heater remains submerged in water; and
 an interior space of the hot water heating tank is divided by a steam/water separating wall having a flow passage opening on a lower end thereof into a hot water heating chamber in which the electric heater is installed and a hot water discharging chamber in which the hot water discharging port is formed.

7. The boiler for hot water heating mats according to claim 6, wherein a plurality of muffling walls are installed in the hot water heating tank at spaced locations between the steam/water separating wall and the hot water discharging port, the muffling walls extending downward from an inner surface of an upper wall of the hot water heating tank.

8. The boiler for hot water heating mats according to claim 6, wherein a reverse flow hole having a fine size is formed in the hot water inlet port of the hot water storage tank or in the connection pipe connecting the hot water discharging port of the hot water heating tank to the hot water inlet port of the hot water storage tank, the reverse flow hole allowing water stored in the hot water storage tank to flow reversely from the hot water storage tank into the hot water heating tank.

9. The boiler for hot water heating mats according to claim 6, wherein each of the hot water discharging check valve and the hot water recovering check valve comprises:
 a cylindrical valve housing having a valve seat on a first end thereof;
 a pin support formed in the valve housing, with a pin insert hole formed through a center of the pin support and with a plurality of through holes formed through the pin support at positions around the pin insert hole;

a disc support pin inserted into the pin insert hole of the pin support, with a disc stopper formed on a first end of the disc support pin and a spring stopper formed on a second end of the disc support pin;

a coil spring fitted over an outer circumferential surface of the disc support pin and placed between the pin support and the spring stopper of the disc support pin; and a valve on/off disc combined with the disc stopper of the disc support pin and brought into close contact with the valve seat of the valve housing by elasticity of the coil spring.

10. The boiler for hot water heating mats according to claim 6, wherein an overcharging prevention unit is provided on a position below the water charging port of the hot water storage tank, the overcharging prevention unit comprising:

a guide rod vertically installed on the inner surface of the bottom of the hot water storage tank, and a ring-shaped float movably fitted over the guide rod.

\* \* \* \* \*